United States Patent
Merlini, III et al.

(10) Patent No.: US 9,194,362 B2
(45) Date of Patent: Nov. 24, 2015

(54) WIND TURBINE SHROUD AND WIND TURBINE SYSTEM USING THE SHROUD

(75) Inventors: Nicholas C. Merlini, III, Painesville, OH (US); Mark L. Cironi, Fairlawn, OH (US)

(73) Assignee: GREEN ENERGY TECHNOLOGIES, LLC, Akron, OH (US)

( * ) Notice: Subject to any disclaimer, the term of this patent is extended or adjusted under 35 U.S.C. 154(b) by 697 days.

(21) Appl. No.: 13/485,227

(22) Filed: May 31, 2012

(65) Prior Publication Data

US 2012/0261925 A1 Oct. 18, 2012

Related U.S. Application Data

(63) Continuation-in-part of application No. 13/431,206, filed on Mar. 27, 2012, now Pat. No. 8,794,903, which is a continuation of application No. 11/845,094, filed on Aug. 27, 2007, now Pat. No. 8,257,019.

(60) Provisional application No. 60/871,135, filed on Dec. 21, 2006.

(51) Int. Cl.
*F03D 3/04* (2006.01)
*F03D 1/04* (2006.01)

(52) U.S. Cl.
CPC ............. *F03D 1/04* (2013.01); *F05B 2240/133* (2013.01); *Y02E 10/725* (2013.01); *Y02E 10/726* (2013.01)

(58) Field of Classification Search
CPC ... F03D 1/04; F05B 2240/13; F05B 2240/133
USPC .......... 415/220; 416/89; 290/44, 55
See application file for complete search history.

(56) References Cited

U.S. PATENT DOCUMENTS

| | | |
|---|---|---|
| 984,599 A | 2/1911 | Pichault |
| 2,137,559 A | 11/1938 | Algee et al. |

(Continued)

FOREIGN PATENT DOCUMENTS

| | | |
|---|---|---|
| GB | 1450348 | 9/1976 |
| GB | 2 230 565 A | 10/1990 |

(Continued)

OTHER PUBLICATIONS

International Search Report and Written Opinion for International Application No. PCT/US14/18301 dated Jun. 6, 2014.

(Continued)

*Primary Examiner* — Ninh H Nguyen
(74) *Attorney, Agent, or Firm* — Tucker Ellis, LLP

(57) ABSTRACT

A wind energy system includes an annular wind shroud surrounding the rotatable blades of a wind turbine. The shroud is configured to enhance the wind power delivered to the rotatable blades of the wind turbine by generating an efficient pressure differential between the blade upstream and downstream wind flows. A radially outwardly extending collar-shaped brim member is formed on an outside of an exhaust opening edge of an outlet of the wind tunnel body and an axially rearwardly extending tubular-shaped rim member is formed on the exhaust opening edge of the outlet of the wind tunnel body. The brim and rim cooperatively generate adjacent annular pressure zones in the downstream flow beneficially effecting the power delivered to the blades intermediate the upstream and downstream flows.

20 Claims, 8 Drawing Sheets

(56) References Cited

U.S. PATENT DOCUMENTS

| | | | |
|---|---|---|---|
| 3,339,078 A | 8/1968 | Crompton | |
| 3,883,750 A | 5/1975 | Uzzell, Jr. | |
| 4,021,135 A | 5/1977 | Pedersen et al. | |
| 4,075,500 A | 2/1978 | Oman et al. | |
| 4,086,498 A | 4/1978 | Szoeke | |
| 4,132,499 A | 1/1979 | Igra | |
| 4,140,433 A | 2/1979 | Eckel | |
| 4,213,734 A | 7/1980 | Lagg | |
| 4,258,271 A | 3/1981 | Chappell et al. | |
| 4,309,146 A | 1/1982 | Hein et al. | |
| 4,323,331 A | 4/1982 | Schachle | |
| 4,324,985 A | 4/1982 | Oman | |
| 4,411,588 A | 10/1983 | Currah, Jr. | |
| 4,482,290 A | 11/1984 | Foreman et al. | |
| 4,616,973 A | 10/1986 | Souchik, Jr. | |
| 4,684,316 A | 8/1987 | Karlsson | |
| 4,720,640 A | 1/1988 | Anderson et al. | |
| 4,781,522 A | 11/1988 | Wolfram | |
| 5,464,320 A | 11/1995 | Finney | |
| 5,599,172 A * | 2/1997 | McCabe | 417/334 |
| 5,669,758 A | 9/1997 | Williamson | |
| 6,053,700 A | 4/2000 | Fosdick | |
| 6,064,123 A | 5/2000 | Gislason | |
| 6,246,126 B1 | 6/2001 | Van Der Veken et al. | |
| 6,382,904 B1 | 5/2002 | Orlov et al. | |
| D487,060 S | 2/2004 | Ehrenberger | |
| 6,710,468 B1 | 3/2004 | O'Shanahan | |
| 6,756,696 B2 | 6/2004 | Ohya et al. | |
| 6,786,697 B2 | 9/2004 | O'Connor et al. | |
| 6,849,965 B2 | 2/2005 | Nabour et al. | |
| 6,887,031 B1 | 5/2005 | Tocher | |
| 6,903,466 B1 | 6/2005 | Mercier | |
| 6,981,839 B2 | 1/2006 | Fan | |
| 7,018,166 B2 | 3/2006 | Gaskell | |
| 7,094,018 B2 | 8/2006 | Grubb | |
| 7,118,344 B2 | 10/2006 | Wieser | |
| 7,147,428 B2 | 12/2006 | Lamont | |
| 7,160,083 B2 | 1/2007 | Pierce et al. | |
| 7,176,584 B1 | 2/2007 | Green | |
| 7,220,096 B2 | 5/2007 | Tocher | |
| 7,230,348 B2 | 6/2007 | Poole | |
| 7,352,075 B2 | 4/2008 | Willey | |
| 7,365,448 B2 | 4/2008 | Stephens | |
| 7,400,057 B2 | 7/2008 | Sureshan | |
| 7,550,864 B2 | 6/2009 | Anderson et al. | |
| 7,633,177 B2 | 12/2009 | Platt | |
| 7,679,206 B1 | 3/2010 | Green | |
| 7,976,268 B2 | 7/2011 | Presz, Jr. et al. | |
| 7,980,811 B2 | 7/2011 | Presz, Jr. et al. | |
| 7,985,052 B2 | 7/2011 | Vettese | |
| 8,021,100 B2 | 9/2011 | Presz, Jr. et al. | |
| 8,067,878 B1 | 11/2011 | Lu et al. | |
| 8,188,611 B2 | 5/2012 | Farb | |
| 8,337,160 B2 * | 12/2012 | Uehara | 416/189 |
| 2002/0047071 A1 | 4/2002 | Illingworth | |
| 2003/0133783 A1 | 7/2003 | Brock et al. | |
| 2003/0175109 A1 | 9/2003 | Brock et al. | |
| 2004/0096327 A1 | 5/2004 | Appa | |
| 2005/0002783 A1 | 1/2005 | Hiel et al. | |
| 2008/0258467 A1 | 10/2008 | Wilson et al. | |
| 2009/0087308 A2 | 4/2009 | Presz | |
| 2009/0230691 A1 | 9/2009 | Presz, Jr. et al. | |
| 2009/0256359 A1 | 10/2009 | Bruk et al. | |
| 2009/0263244 A1 | 10/2009 | Presz, Jr. et al. | |
| 2009/0317231 A1 | 12/2009 | Presz, Jr. et al. | |
| 2010/0028132 A2 | 2/2010 | Presz | |
| 2010/0068029 A1 | 3/2010 | Presz, Jr. et al. | |
| 2010/0086393 A1 | 4/2010 | Presz, Jr. et al. | |
| 2010/0119361 A1 | 5/2010 | Presz, Jr. et al. | |
| 2010/0143092 A1 | 6/2010 | Hjort | |
| 2010/0247289 A1 | 9/2010 | Presz, Jr. et al. | |
| 2010/0270802 A1 | 10/2010 | Presz, Jr. et al. | |
| 2011/0042952 A1 | 2/2011 | Ohya et al. | |
| 2012/0086216 A1 | 4/2012 | Ohya et al. | |
| 2012/0261925 A1 | 10/2012 | Merlini, III et al. | |

FOREIGN PATENT DOCUMENTS

| | | |
|---|---|---|
| JP | 51-67943 | 5/1976 |
| JP | 59-007784 | 1/1984 |
| JP | 2001-055969 | 2/2001 |
| JP | 2002-213343 | 7/2002 |
| JP | 2002213343 A2 | 7/2002 |
| JP | 2003-003944 | 1/2003 |
| JP | 2003-278635 | 10/2003 |
| JP | 2004-052720 | 2/2004 |
| JP | 2010101276 A2 | 5/2010 |
| JP | 2011256862 A2 | 12/2011 |
| RU | 2006663 C1 | 1/1994 |
| WO | WO 2008-017106 A1 | 2/2008 |
| WO | WO 2010-011158 A1 | 1/2010 |

OTHER PUBLICATIONS

Green Energy: "Wind Energy for Your World" 2012.
Ohya et al. "Development of Shrouded Wind Turbines with Wind-Lens Technology" 2011.
Highlighting Japan: "Embracing New Energy" Jul. 2011, vol. 5, No. 3.
Ohya et al. "A Highly Efficient Wind Turbine with Wind-Lens Shroud".
Ohya et al. "A Shrouded Wind Turbine Generating High Output Power with Wind-lens Technology" 2010.
International Search Report and Written Opinion dated Nov. 10, 2008 for the related International Application No. PCT/US2008/074532.
Jischke, M.C. "On the Aerodynamics of Windmill Blades" Proceedings of the Oklahoma Academy of Science, vol. 56, pp. 121-124; 1976.

* cited by examiner

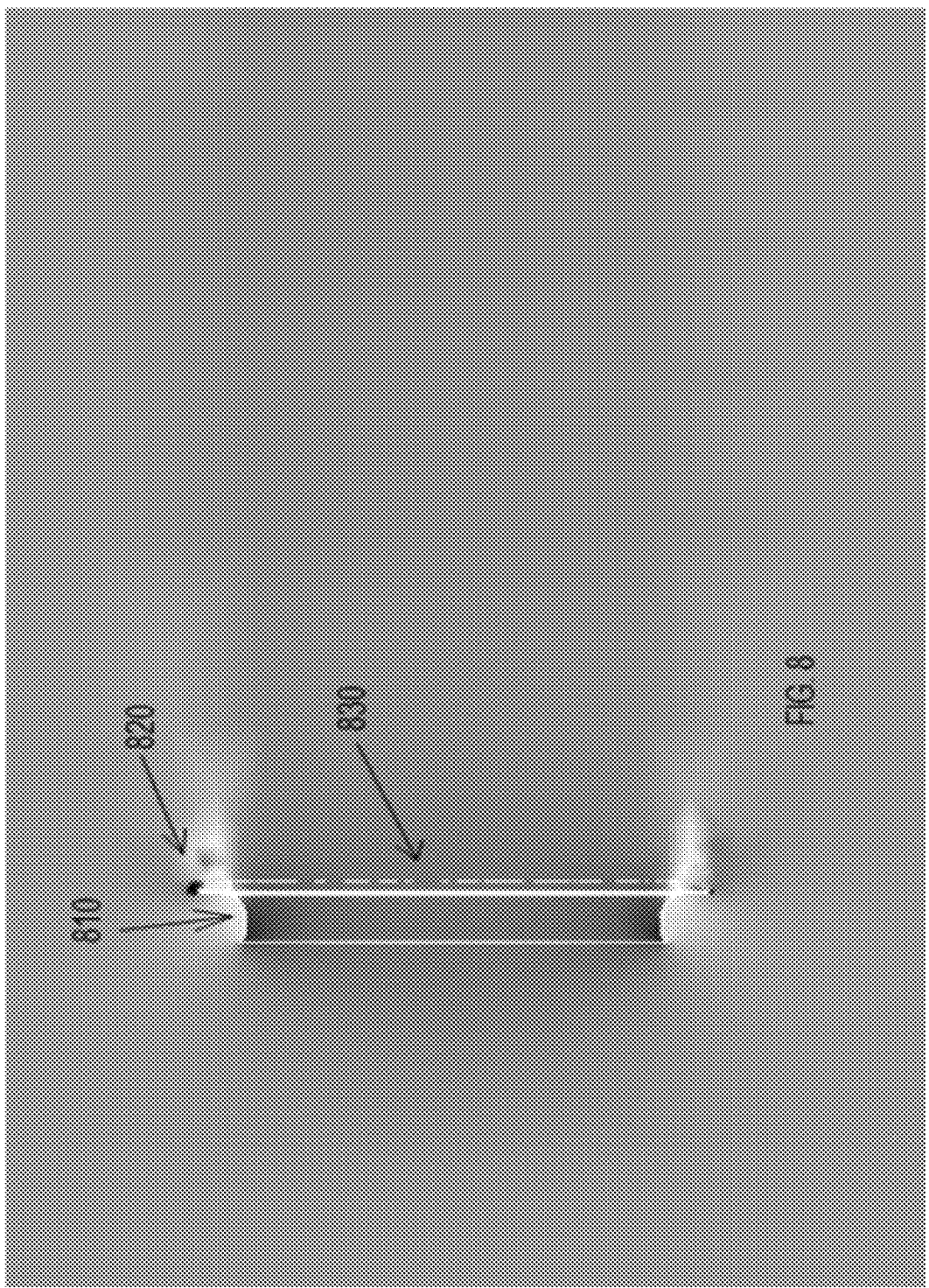

WIND TURBINE SHROUD AND WIND TURBINE SYSTEM USING THE SHROUD

CROSS-REFERENCE TO RELATED APPLICATIONS

This application is a continuation-in-part of U.S. patent application Ser. No. 13/431,206, filed Mar. 27, 2012 now U.S. Pat. No. 8,794,903, which is a continuation of U.S. patent application Ser. No. 11/845,094, filed Aug. 27, 2007 now U.S. Pat. No. 8,257,019, which claims the benefit of priority to U.S. provisional application No. 60/871,135, filed Dec. 21, 2006.

TECHNICAL FIELD

The embodiments herein generally relate to methods and apparatus for producing electric power from a moving fluid flow. The embodiments herein also relate in particular to methods and apparatus for producing electric power from wind energy using a shroud shaped to beneficially modify a wind flow to increase a power of the flow within the shroud relative to an electromechanical turbine generator.

BACKGROUND

Most electricity today is generated by burning fossil fuels and producing steam which is then used drive a steam turbine that, in turn, drives an electrical generator. Unfortunately, however, the world's supply of fossil fuels is large, but finite. Exhaustion of low-cost fossil fuels will have significant consequences for energy sources as well as for the manufacture of plastics and many other things.

More serious are concerns about the emissions that result from fossil fuel burning. Fossil fuels constitute a significant repository of carbon buried deep under the ground. Burning them results in the conversion of this carbon to carbon dioxide, which is then released into the atmosphere. This results in an increase in the Earth's levels of atmospheric carbon dioxide, which enhances the greenhouse effect and contributes to global warming. Depending upon the particular fossil fuel and the method of burning, other emissions may be produced as well. Ozone, SO2, NO2 and other gases are often released, as well as particulate matter. Sulfur and nitrogen oxides contribute to smog and acid rain. Fossil fuels, particularly coal, also contain dilute radioactive material, and burning them in very large quantities releases this material into the environment, leading to low but real levels of local and global radioactive contamination. Coal also contains traces of toxic heavy elements such as mercury, arsenic and others. Mercury vaporized in a power plant's boiler may stay suspended in the atmosphere and circulate around the world.

An alternative source of renewable energy, solar cells, also referred to as photovoltaic cells, use the photovoltaic effect of semiconductors to generate electricity directly from sunlight. Their use has been rather limited because of high manufacturing costs. Disadvantageously, the manufacturing process also consumes considerable fossil fuels, resulting in pollution. Additionally, refined silicon required for the semiconductors is in short supply, making solar cells relatively costly. Solar electricity currently tends to be more expensive than electricity generated by other sources. Furthermore, solar energy is not available at night, may be unavailable due to weather conditions, and may be compromised during winter months; therefore, a storage or complementary power system is required for most applications.

Moreover, solar energy is inefficient. Expensive solar cells made from single crystal silicon are currently limited to about 25% efficiency because they are most sensitive to infrared light, and radiation in this region of the electromagnetic spectrum is relatively low in energy. Polycrystalline solar cells are made by a casting process in which molten silicon is poured into a mold and allowed to cool, then sliced into wafers. This process results in cells that are significantly less expensive to produce than single crystal cells, but whose efficiency is limited to less than 20% due to internal resistance at the boundaries of the silicon crystals. Amorphous cells are made by depositing silicon onto a glass substrate from a reactive gas such as silane (SiH4). This type of solar cell can be applied as a thin film to low cost substrates such as glass or plastic. Thin film cells have a number of advantages, including easier deposition and assembly, the ability to be deposited on inexpensive substrates, the ease of mass production, and the high suitability to large applications. Since amorphous silicon cells have no crystal structure at all, their efficiencies are presently only about 10% due to significant internal energy losses.

Another attractive alternative source of renewable energy, wind power, produces electricity from the flow of air over the surface of the earth. Wind rotates a rotor mechanically coupled to an electric generator to produce electricity. Unlike solar cells, properly located wind turbines can generate the energy used in its construction within just months of operation. Greenhouse gas emissions and air pollution produced by construction of a wind turbine are small and declining. There are no emissions or pollution produced by operation of a wind turbine. Modern wind turbines are almost silent and rotate so slowly (in terms of revolutions per minute) that they are rarely a serious hazard to birds. Aesthetic, landscape and heritage issues may be a significant issue for certain wind farms. However, when appropriate planning procedures are followed, these risks are minimal and should be weighed against the need to address the threats posed by climate change and the opinions of the broader community.

Unfortunately, conventional wind turbines suffer several serious shortcomings. For example, they rely exclusively on ambient wind speed. Nothing is done to effectively accelerate the wind or the power quotient of the wind at the rotating blades using negative pressures in an area downstream of the blades and thereby attempt to improve efficiency of the turbine. Known prior art wind energy systems that include a shroud create little meaningful negative pressure regions in an area downstream of the blades.

Another shortcoming of conventional wind turbines is the required excessive blade size to drive a particular generator. As conventional wind turbines do little to effectively augment wind speed, power requirements are met by up-sizing the rotor. A large generator, of course, requires substantial power provided by a large rotor to turn. This approach ignores the relationship of wind speed to power, whereby an increased wind speed augments power output. Disadvantageously, a larger rotor increases manufacturing and construction costs, stresses on the support structure, wear and tear on bearings, and maintenance costs.

The example embodiments herein are directed to overcoming one or more of the problems and solving one or more of the needs as set forth above.

SUMMARY OF THE EMBODIMENTS

To solve one or more of the problems set forth above, in an exemplary implementation of the invention a wind energy system is provided with a shroud for each turbine. The shroud is adapted to direct and accelerate wind relative to the turbine. In accordance with an embodiment, the shroud effectively accelerates the wind and increases the power quotient of the wind at the rotating blades of an associated wind turbine using negative pressures developed by the shroud structure in an area downstream of the blades thereby significantly improving efficiency of the associated turbine.

In accordance with one example embodiment, a wind shroud is provided for use with an associated wind power generator including a wind turbine for generating electricity. The wind shroud includes a cylindrical wind tunnel body, a radially outwardly extending collar-shaped brim member, and an axially extending tubular-shaped rim member. The wind tunnel body defines a central longitudinal axis therethrough. In addition, the wind tunnel body has an inlet configured to receive a wind flow into the wind tunnel body, an outlet configured to expel the wind flow out from the wind tunnel body, and a central side wall portion configured to communicate the wind flow from the inlet to the outlet in a wind flowing direction. The brim member is formed on an outside of an exhaust opening edge of the outlet of the wind tunnel body. The rim member is formed on the exhaust opening edge of the outlet of the wind tunnel body. During use, of the wind shroud, the associated wind turbine is configured to be arranged adjacent to the inlet of the wind tunnel body.

In accordance with another example embodiment, a wind power generator is provided for generating electricity from a moving fluid flow such as a wind flow for example. The wind power generator includes a wind shroud and a wind turbine having rotatable blades disposed in the wind shroud for generating electricity. The wind shroud includes a cylindrical wind tunnel body, a radially outwardly extending collar-shaped brim member, and an axially extending tubular-shaped rim member. The wind tunnel body defines a central longitudinal axis therethrough, and has an inlet configured to receive a wind flow into the wind tunnel body, an outlet configured to expel the wind flow out from the wind tunnel body, and a central side wall portion configured to communicate the wind flow from the inlet to the outlet in a wind flowing direction. The brim member is formed on an outside of an exhaust opening edge of the outlet of the wind tunnel body. The rim member is formed on the exhaust opening edge of the outlet of the wind tunnel body.

BRIEF DESCRIPTION OF THE DRAWINGS

The foregoing and other aspects, objects, features and advantages of the embodiments herein will become better understood with reference to the following description, appended claims, and accompanying drawings, wherein:

DETAILED DESCRIPTION OF THE EMBODIMENTS

Figure 1:
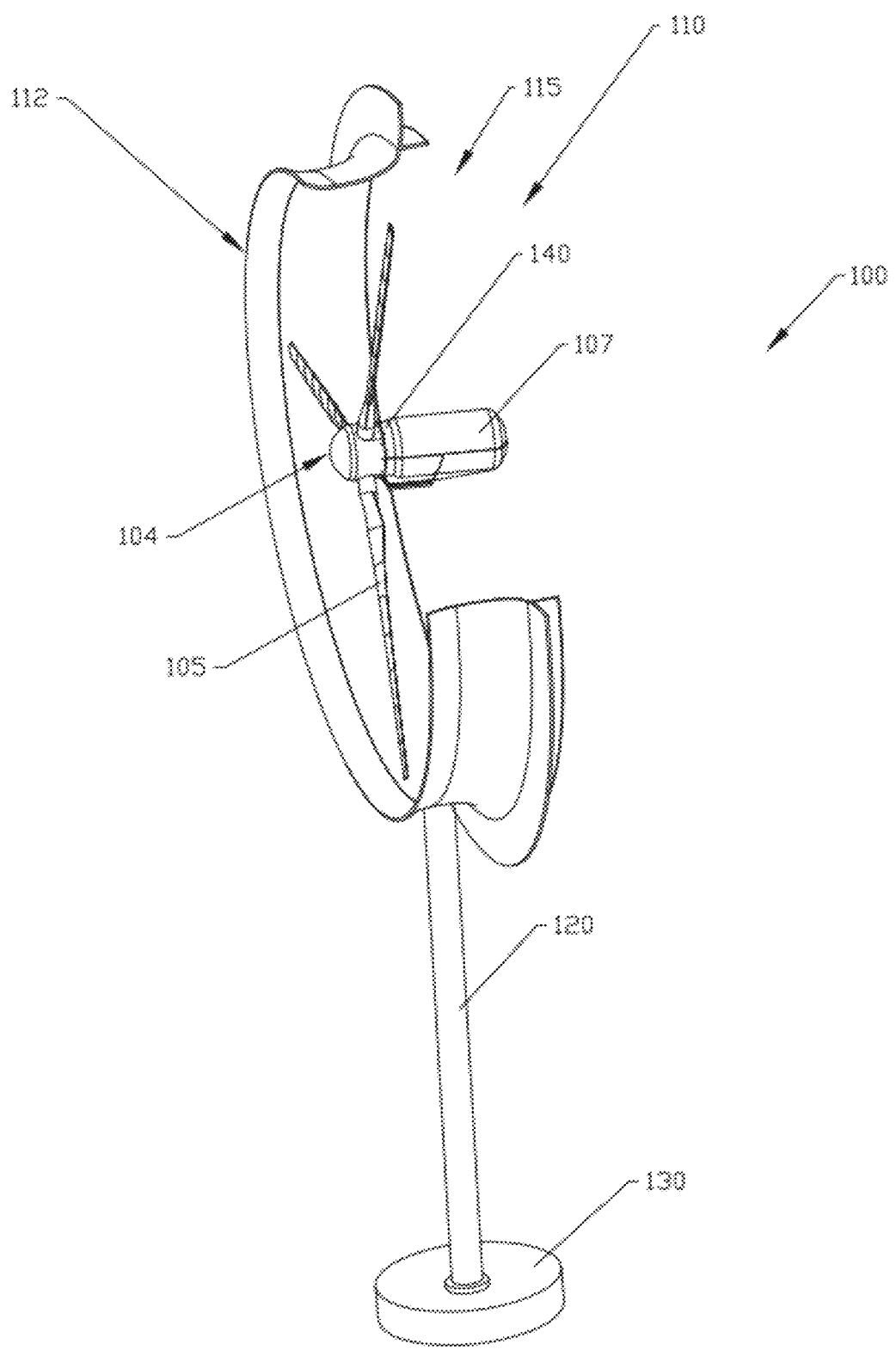
FIG. 1 is a perspective view of a wind power generator including a wind turbine for generating electricity and a wind shroud in accordance with an embodiment.

Referring to the Figures, in which like parts are indicated with the same reference numerals, various views of exemplary wind turbine systems and assemblies and components thereof according to principles of the embodiments are shown. An exemplary wind turbine system according to principles herein includes a specialized wind shroud having a brim and a rim and a wind turbine having rotatable blades disposed in the wind shroud for generating electricity. In the example embodiments the exemplary wind turbine system may selectively include a tower construction, a yaw drive assembly, a rotor with rotor blades, a nacelle with a drive train and miscellaneous other components.

With reference first to FIG. 1, a wind tower system 100 includes a wind power generator 110 supported by a vertical support structure 120, and a foundation 130 which anchors the system 100 to the ground. In the example embodiment, the wind power generator 110 includes an annular wind shroud 112 and a wind turbine 104 for generating electricity. In order to ensure stability, one or more piles and/or a flat foundation may be used, depending on the consistency of the underlying ground. A flat foundation 130 comprises a large reinforced concrete slab which forms the footing of the generator. In a pile foundation, foundation plates (plate foundations) are fixed with piles into the earth. This is particularly useful in soft subsoil.

A tower construction, exemplary embodiments of which are described below, carries the weight of the supported equipment, including the wind shroud 112 and the wind turbine 104 and other components such as a support frame, nacelle, and the rotor blades 105 and generator 107 of the wind turbine, while withstanding the huge static loads caused by the varying power of the wind. The tower construction elevates the system to a desired height, e.g., thirty feet or more above ground level. A tower construction of concrete, steel or other building materials may be used. The tower construction may be a containment structure suitable for housing equipment, a lattice or truss assembly, or other suitable stable form. In the case of concrete, the tower may be constructed on site, which simplifies transport and fitting. Alternatively, pre-cast concrete segments may be shipped and assembled on site.

The wind power generator 110 supported by the vertical support structure 120 adapted for controlled yaw movement relative to the foundation 130 according to principles of the embodiments herein as shown. The support structure 120 may be mounted on a turntable of a yaw drive assembly controllably driven by a motor in accordance with U.S. Ser. No. 11/845,094 incorporated herein by reference. A nacelle 115 and rotor assembly, which comprises a hub 140 and plurality (e.g., three or more) of rotor blades 105, are supported by a frame (not shown for clarity of illustrating the shroud 112). The yaw motor may be manually actuated by a switch and/or automatically operated using a programmable logic controller, microcontroller or other control means, to maintain in a direction facing the wind.

In the example embodiment shown, the support structure 120 is essentially a mast, but may take on any desired configuration such as for example, a framework of beams forming a rigid A-shaped support structure. However, any structure suitable for supporting the wind shroud, nacelle and rotor assembly may be utilized and comes within the scope of the embodiments. Such structures may, for example, include tubular steel, concrete post, lattice structures, and other suitable structures.

The rotor assembly, with the help of the rotor blades 105, converts the energy in the wind into rotary mechanical movement. In an exemplary implementation, a three-blade, horizontal axis rotor assembly is utilized. The rotor blades 105 may be comprised of fiber reinforced (e.g., glass, aramid or carbon-fiber reinforced) plastics (GRP, CFRP), aluminum, alloys, combinations thereof, or other suitable material. The blade profile (airfoil shape) is similar to that of an aircraft wing and uses the same aerodynamic principles to generate lift, which cause the rotor to rotate.

The rotor comprises multiple rotor blades 105 attached to a hub 140. The rotor converts the wind energy into a rotation. In an exemplary embodiment, the rotor has three blades, a horizontal axis, and a diameter of approximately fifteen (15) feet or more. The use of three (3) rotor blades 105 allows for a better distribution of mass than conventional two (2) blade designs, which makes rotation smoother. As an alternative, a five (5) blade design may be used as well and also allows a smaller diameter than conventional two (2) blade designs that produce similar forces under similar wind conditions.

The hub 140 is the center of the rotor assembly to which the rotor blades 105 are attached. The hub 140 directs the energy from the rotor blades 105 on to the generator 107. If the wind turbine has a gearbox, the hub 140 is connected to the gearbox shaft, converting the energy from the wind into rotation energy. If the turbine has a direct drive, the hub 140 passes the energy directly to a ring generator. Each rotor blade 105 can be attached to the hub 140 in various ways: either in a fixed position or with pitch adjustment. A fixed hub 140 is sturdy, reduces the number of movable components that can fail, and is relatively easy to construct. Pitch adjustment enables manual or remote adjustment of blade pitch to improve efficiency.

The hub 140 thus locates and captures the rotor blades 105 within a plane defined by the annular wind shroud 112. The hub 140 correctly positions the rotor blades 105 for correct tilt and angular placement. The blades selectively are locked in position using heavy duty mechanical clamps and a locking pin. The locking pin uses two hardened pins locating in a recess in the rotor blade and further locating in the hub 140 to provide positive locking. The blades can be manually adjusted for pitch in the hub 140.

In a preferred example embodiment, each individual rotor blade 105 can be infinitely adjusted manually, electromechanically or hydraulically, by turning into or out of the wind. In such an embodiment, the rotor blades may be positioned at a pitch angle suitable for generating acceptable lift, such as maximum lift, at a design wind speed (e.g., average prevailing local wind speed for the location of the turbine).

Alternatively, each individual rotor blade 105 can be adjusted automatically. Actuators for automated or remote pitch adjustment may be either hydraulic or electro-mechanical. In an automated embodiment, a controller monitors the turbine's power output and/or rotational speed. If the wind is too strong, the rotor blades 105 may be pitched slightly to reduce lift, so that the rotor continues to generate power at rated capacity even at high wind speeds. Otherwise, the system may maintain the rotor blades at a pitch angle suitable for generating acceptable lift, such as maximum lift, for the design or detected wind speed.

Advantageously, a wind turbine system according to principles of the example embodiments herein may utilize conventional commercially available electronic equipment, including a generator, a system for grid in-feed of the electricity, and various sensors and controls. The system for feeding electricity into the grid depends upon the generator used. In a variable speed turbine embodiment with a synchronous generator, alternating current generated fluctuates constantly in frequency and quantity. In order for the electricity to be fed into the grid, it is converted into direct current using a rectifier, filtered and then converted back into alternating current using an inverter. Voltage is converted for connection to the level of the grid using a transformer. Sensors for monitoring and control may be provided on and in the nacelle to measure wind speed and wind direction, speed of the rotors and the generator, the ambient temperature and temperature of individual components, oil pressure, pitch and azimuth angle (yaw mechanism based on the wind direction) and electrical values, as well as vibrations or vibrations in the nacelle. Data from sensor signals may be used to control operation. For example, in response to signals corresponding to wind direction, the yaw mechanism may be activated. An exemplary wind turbine system according to principles of the embodiments may also contain components lighting, cooling, heating, lightning protection, lifting gear (e.g. winches for spare parts), communications equipment and fire extinguishing equipment.

Figure 2:
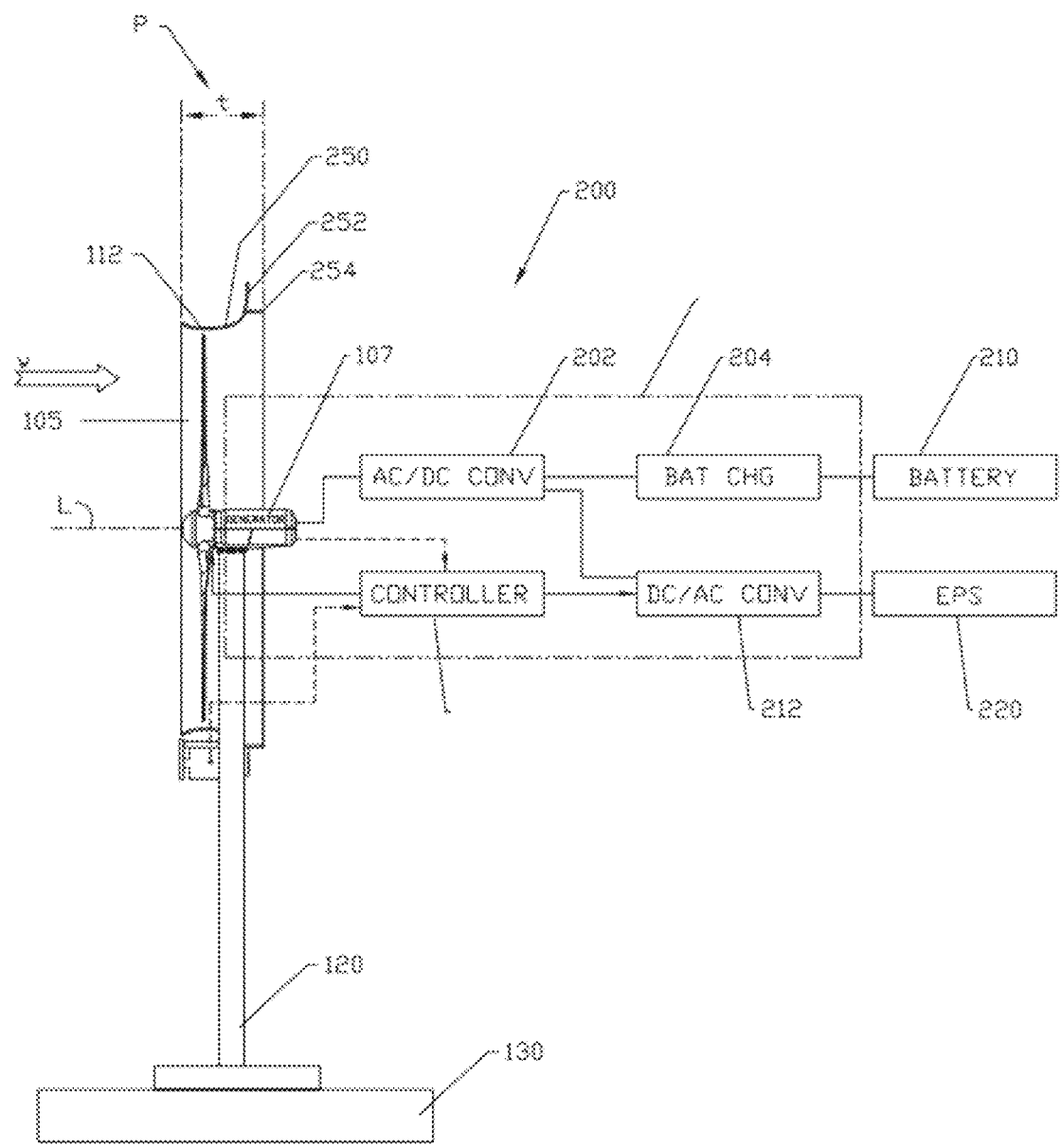
FIG. 2 is a schematic diagram of an internal block configuration of the wind power generator according to an embodiment in which a wind turbine generates electric power.

The electric power generating system 200 component of the system 100 of FIG. 1 is shown in schematic form in FIG. 2 and, with reference now to that Fig., the rotational force developed in the impeller blades 105 of the wind turbine by wind passing therethrough is transmitted to the electric generator 107 thereby driving the electric generator 107 and causing it to generate electric power. Electricity thereby generated may be supplied to an associated outside circuit such as for example the electric power grid or, preferably, to an electric storage device such as a battery 210. The wind turbine is not limited to a wind turbine equipped with an electric generator, however, wherein the rotational force may also be directly mechanically outputted without connection with the electric generator 107. For instance, the rotary shaft may be operatively coupled to a drive shaft of a pump for pumping water or the like.

In the example embodiment of use of the system 100 for generating electricity, the electric generator 107 generates AC power which is in turn supplied to an AC/DC converter 202, where the power is converted into DC power. The battery 210 is charged with the thus-converted DC power by means of a battery charger 204. The battery 210 can be utilized as an emergency power source. The DC power from the AC/DC converter 202 is subjected to power control performed by a DC/AC converter (inverter) 212, to thus again become predetermined power and converted into AC power. The AC power is sent as the AC power source to a power system 220. The above-described configuration of the power system 200 is presented by way of example only and is not intended to limit the embodiments herein. Other embodiments for example include those described in co-pending related application Ser. No. 11/845,094.

A voltage/current guided from the AC/DC converter 202 to the DC/AC converter 212 is detected as a voltage/current by means of an unillustrated voltage/current sensor. A detection signal is input to the controller 214. In accordance with the detection signal, the controller 214 controls the DC/AC converter 212, thereby performing operation so as to keep the voltage constant and unchanged. The thus-controlled power is supplied to the associated power system 220.

With continued reference to FIG. 2, as illustrated in cross-section, the wind shroud 112 has a thickness t in a wind flowing direction W. As described above and as will be appreciated, the wind shroud 112 has an annular conformation and, accordingly, defines a plane P having the thickness t as illustrated. Preferably, the blades 105 of the generator are disposed within the thickness of the plane P for beneficial results of enhanced wind power concentration owing to the configuration of the shroud structure as will be described in greater detail below. In general, the wind shroud 112 includes a cylindrical wind tunnel body 250 defining a central longitudinal axis L therethrough, a radially outwardly extending collar-shaped brim member 252, and an axially extending tubular-shaped rim member 254.

Figure 3:
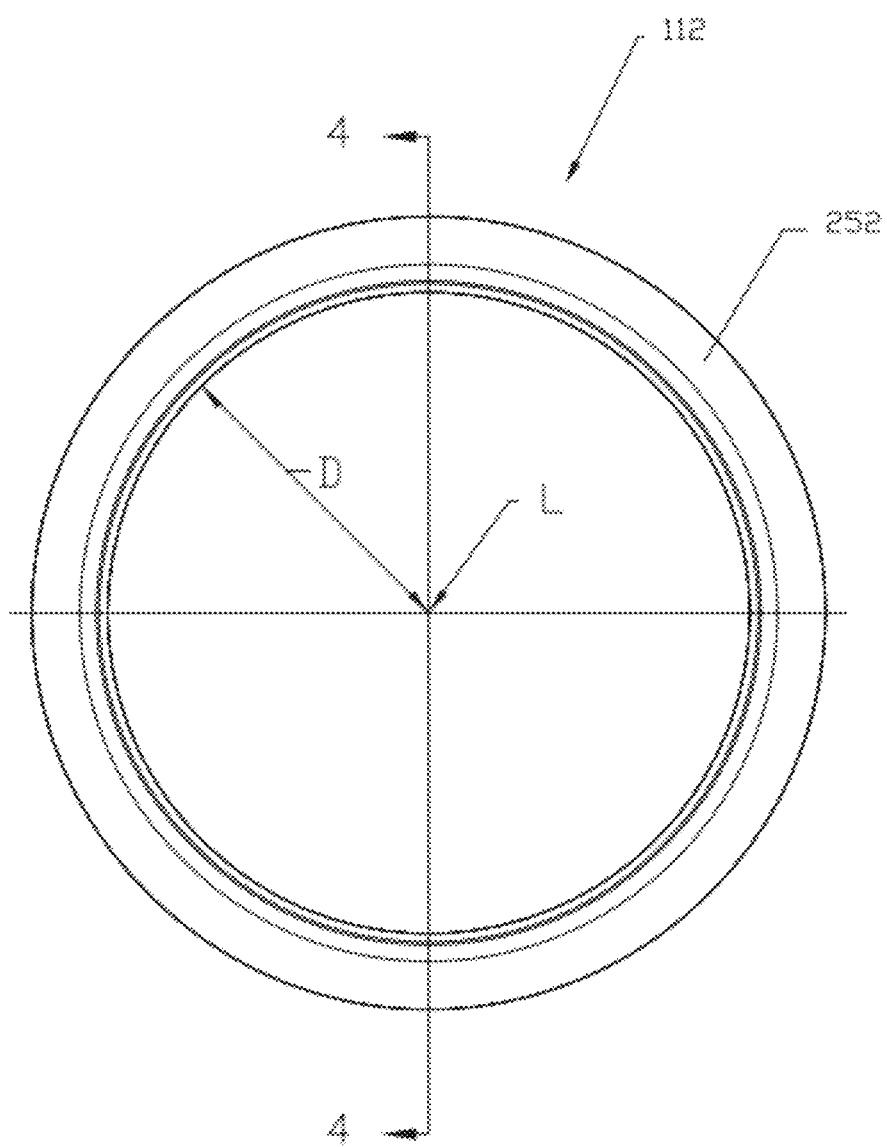
FIG. 3 is an elevational view of a wind shroud apparatus formed in accordance with an example embodiment.
Figure 4:
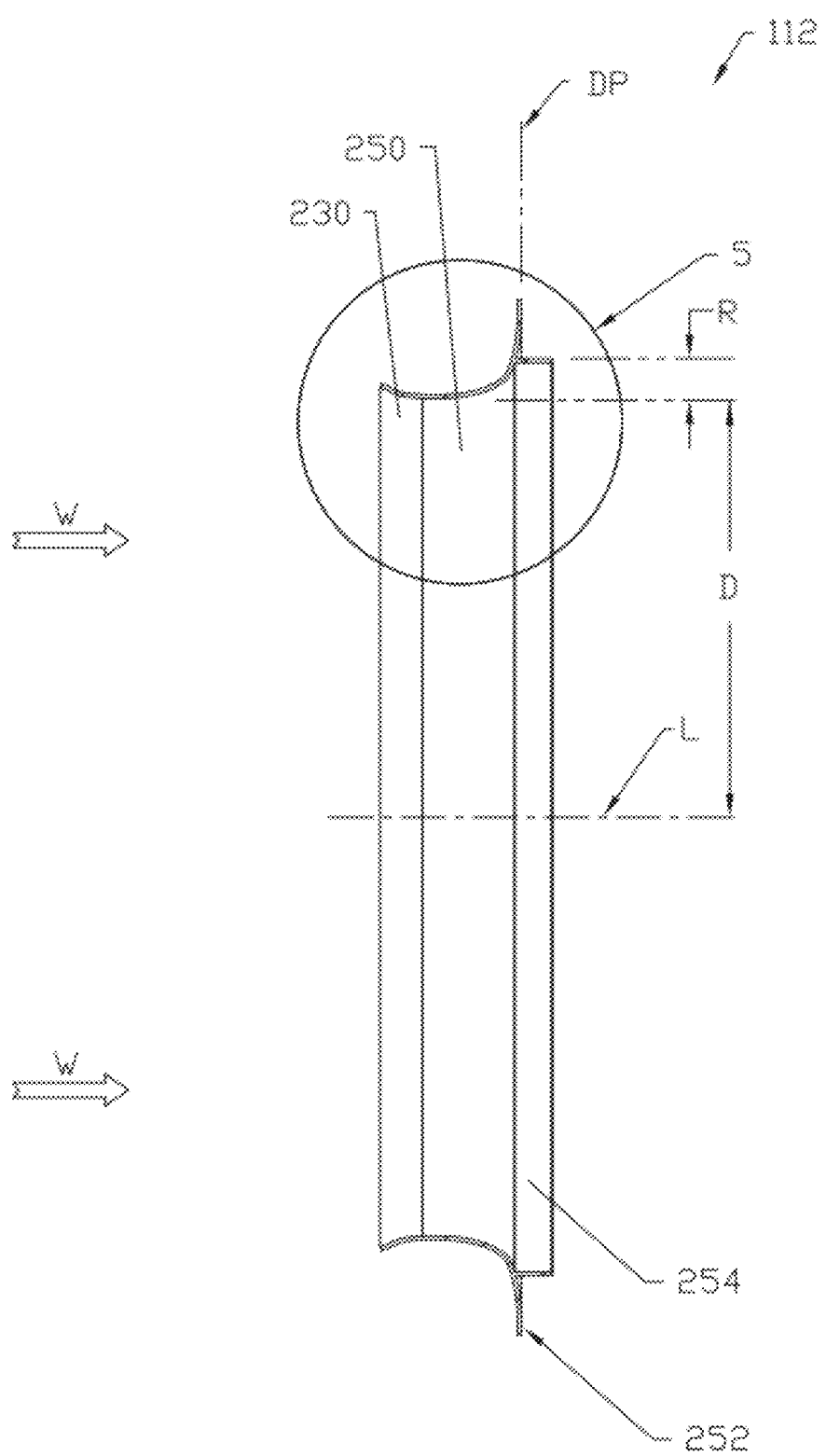
FIG. 4 is a cross-sectional view of the wind shroud apparatus of FIG. 3, taken along line 4-4 thereof.
Figure 5:
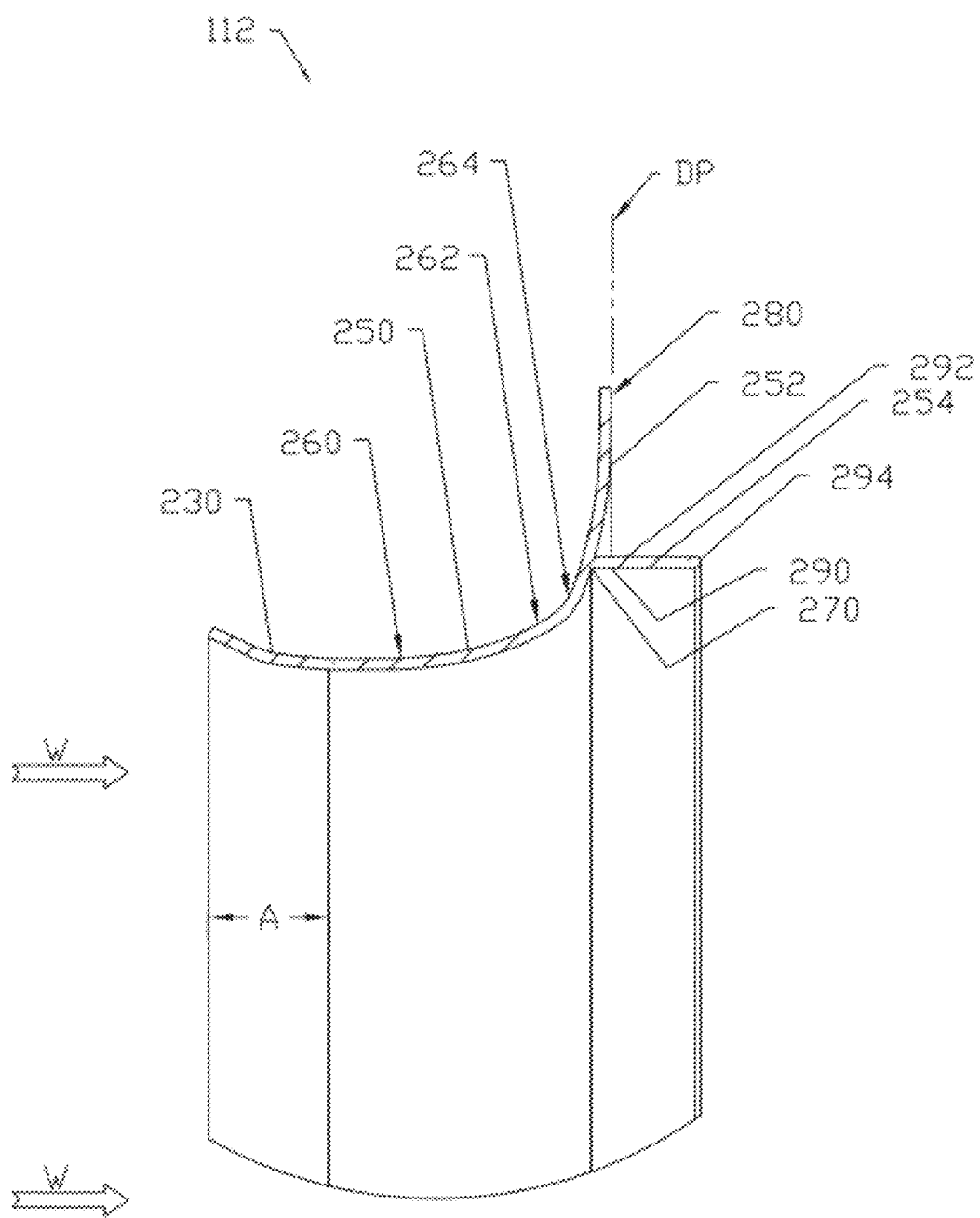
FIG. 5 is an enlarged view of a portion of the wind shroud apparatus of FIG. 4 within the circle identified at 5.

The preferred structure and overall configuration of the wind shroud 112 of the example embodiment is best understood with reference to FIGS. 3-5 wherein, as illustrated in FIG. 3, the wind shroud 112 has an annular overall shape. The cylindrical wind tunnel body 250 defines a central longitudinal axis L therethrough, and has an inlet 260 configured to receive a wind flow into the wind tunnel body, an outlet 264 configured to expel the wind flow out from the wind tunnel body, and a central side wall portion 262 configured to communicate the wind flow from the inlet to the outlet in a wind flowing direction W. The radially outwardly extending collar-shaped brim member 252 is formed on an outside of an exhaust opening edge 270 of the outlet 264 of the wind tunnel body 250. The axially extending tubular-shaped rim member 254 is also formed on the exhaust opening edge 270 of the outlet 264 of the wind tunnel body 250. Overall, therefore, the brim member 252 defines an annular diffuser member 280.

In addition and with continued reference to FIGS. 3-5, the annular diffuser member 280 defines a diffuser plane DP perpendicular to the central longitudinal axis L of the wind tunnel body 250. Preferably, as shown, the rim member 254 and the central side wall portion 262 of the wind tunnel body 250 are disposed on opposite sides of the diffuser plane P.

In the example embodiment, one preferred size of the shroud 112 without limitation to other sizes is an overall size of about 425 inches in a direction transverse to the longitudinal axis L by about 81 inches in the direction of the longitudinal axis L, wherein the inner diameter D of the main body is about 207 inches. In the example, the brim member 252 extends radially outwardly from the exhaust opening edge 270 of the outlet 264 of the wind tunnel body 250 by about 31.5 inches. Also in the example, the rim member 254 extends axially in the wind direction W from the exhaust opening edge 270 of the outlet 264 of the wind tunnel body 250 by about 13.6 inches. Further in the example embodiment, the rim member 254 is spaced radially outwardly from the inner diameter D by a distance of about 18 inches.

It is to be appreciated that the dimensions described above are merely representative of an example embodiment only in that other sizes and shapes of a shroud 112 having a wind tunnel body 250 with both a brim member 252 and a rim member 254 may be equivalently used as well. It is to be further appreciated that although the brim and rim members are illustrated as being generally rectangular in cross-section, other shapes, sizes, and orientations of the brim and rim members may equivalently be used as well. For example, the brim and rim members 252, 254 may be provided with one or more lips, ridges, textured surfaces, or one or more special cross-sectional variations as necessary or desired. Also, one or both of the brim and rim members 252, 254 may be arranged to extend from the exhaust opening edge 270 in both axial and radial directions, essentially defining a conic-section in these regions of the shroud. That is, as shown in FIG. 5, the brim member 252 extends essentially only radially outwardly but could also be inclined in the axial direction to lean into or with the wind direction D. Similarly, although the rim member 254 shown in the embodiment extends essentially only in the axial direction, it may be oriented to extend radially outwardly away from the longitudinal axis L or inwardly toward the longitudinal axis L, as necessary or desired.

As shown best in FIG. 5 but with reference also to FIGS. 3 and 4, the rim 254 member comprises a lead edge 290 connected with the exhaust opening edge 270 of the outlet 264 of the wind tunnel body 250, wherein the lead edge 290 is spaced radially outwardly relative to the central longitudinal axis by a first predetermined distance. A trailing edge 294 is spaced from the exhaust opening edge of the outlet of the wind tunnel body in the wind flowing direction, wherein the trailing edge 294 is spaced radially outwardly relative to the central longitudinal axis L by a second predetermined distance, and a central region 292 extending between the lead 292 and trailing 294 edges of the rim member. In the example embodiment, the first and second predetermined distances D are the same. However, as noted above, the direction may be different wherein the rim member 254 has a component of extension in the radial direction towards or away from the related longitudinal axis L.

Lastly with reference to FIGS. 3-5, an air horn member 230, narrowing in the wind flowing direction, is formed on an intake opening edge of the inlet of the wind tunnel body. The air horn member 230 is substantially cylindrical and has a dimension A in the wind direction of about 21 inches.

Figure 6:
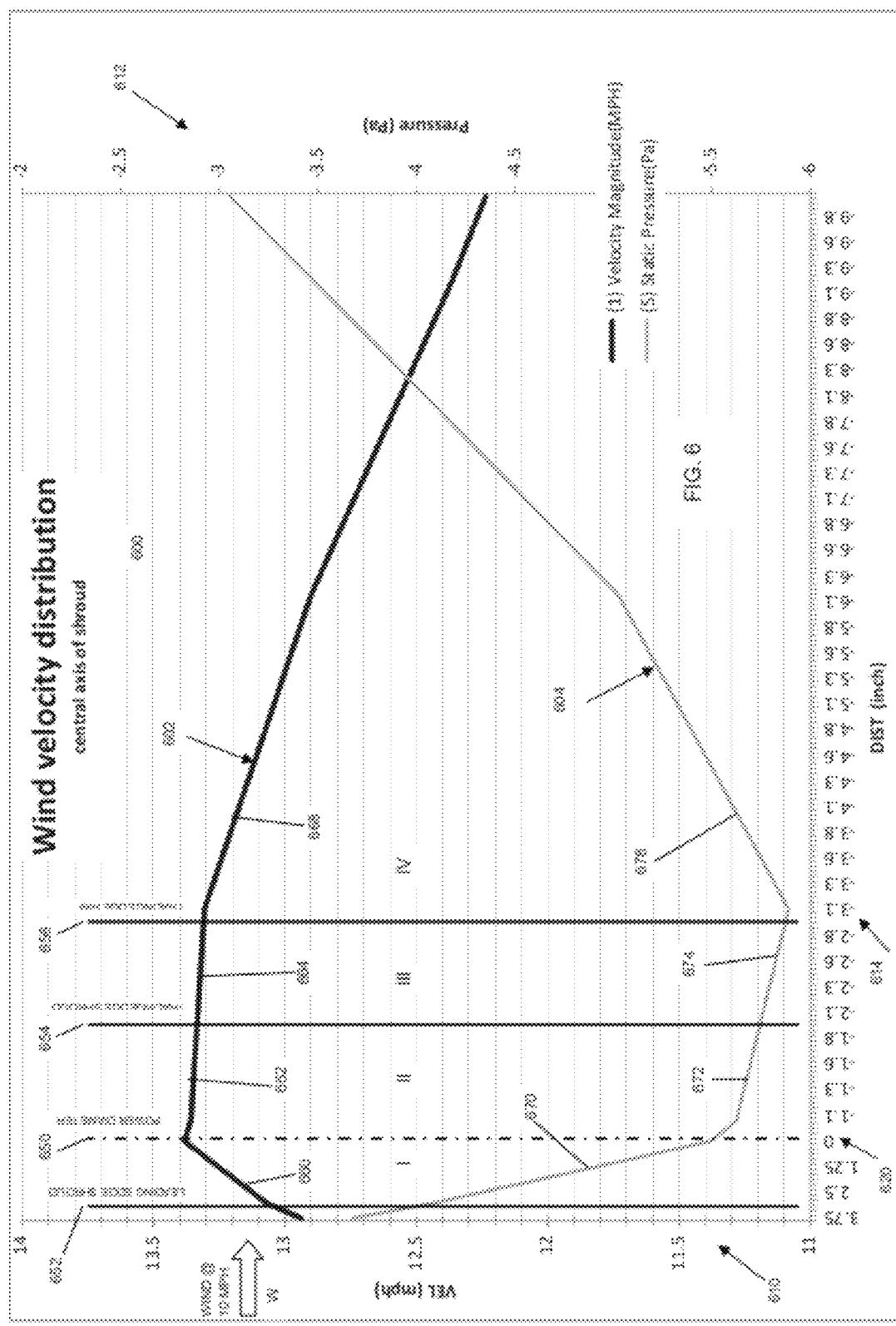
FIG. 6 is chart illustrating a wind velocity distribution of an air flow passing through the shroud of FIGS. 1 and 3-5.

With reference next to FIG. 6 a wind velocity distribution is chart 600 is shown illustrating an air flow passing through the shroud of FIGS. 1 and 3-5. It is to be appreciated that the wind velocity distribution chart 600 represents the wind velocity distribution of a component of the wind passing through the central longitudinal axis L of the subject shroud 112. The charge 600 includes a velocity magnitude curve 602 and a static pressure curve 604. For purposes of the velocity magnitude curve 602, a first axis 610 represents wind velocities in the range of about 11 miles per hour (mph) to about 14 mph. Similarly, for the static pressure curve 604, a second axis 612 represents the static pressure in Pascals (PA) of the wind passing through the shroud within a range of −6 Pascals to about −2 Pascals. A third axis 614 in the wind velocity distribution chart 600 is representative of a linear distance extending through the shroud 112 along the central longitudinal axis L wherein the range is set at a datum 620 defined at a power diameter 650 of the shroud to be described in greater detail below. The range of the third axis 614 extends from 3.75 inches in the direction opposite to the wind direction W and to a distance of −9.8 inches in the wind flowing direction W.

A wind shroud 112 having the dimensions described above in the presence of a substantially constant uniform wind flowing into the shroud at a continuous sustained rate of about 10 mph exhibits the velocity magnitude and static pressure curves 602, 604 shown in the Figure.

Figure 7:
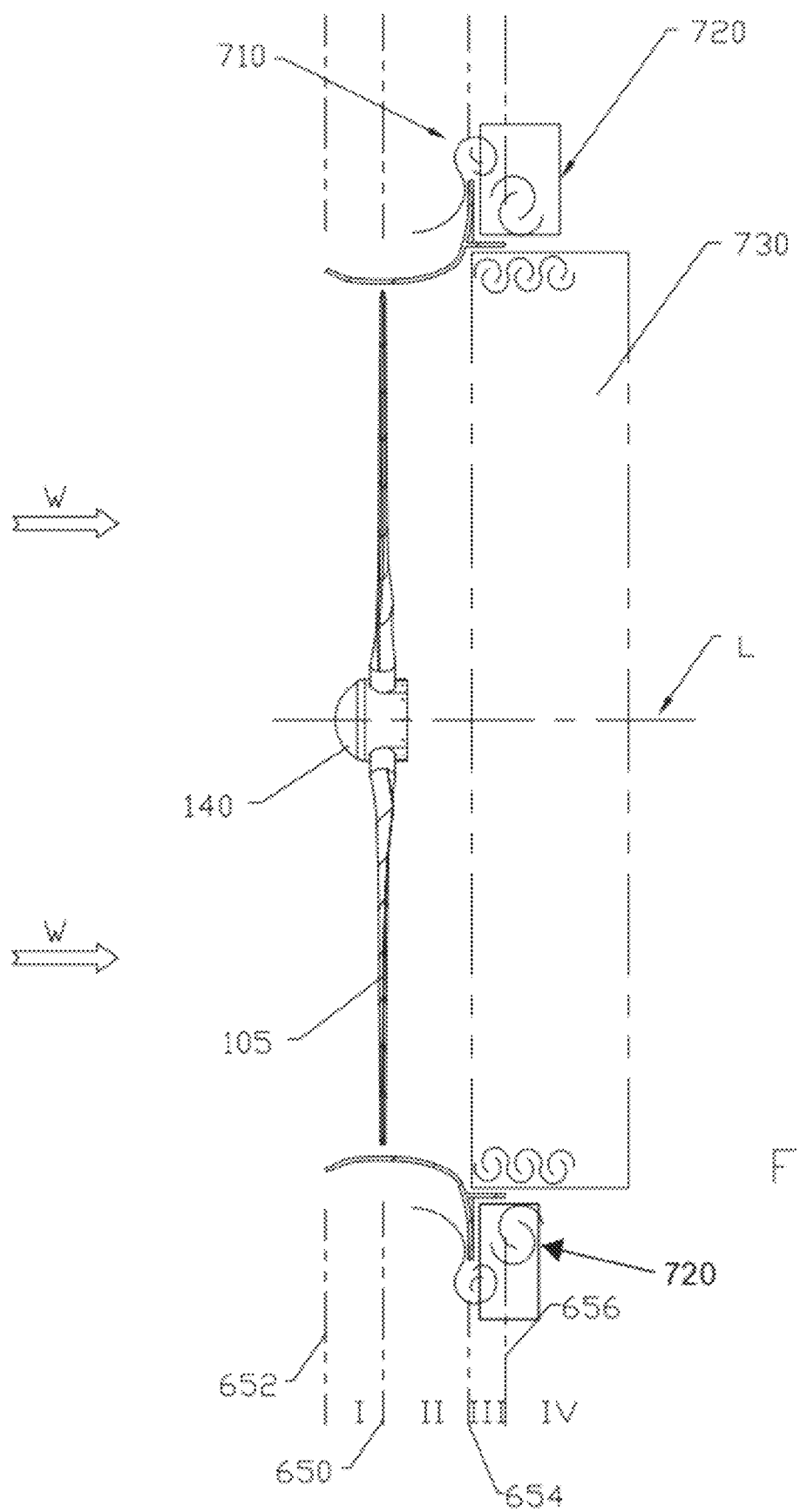
FIG. 7 is a vertical simplified sectional view of the wind power generator of FIGS. 1 and 2 showing wind flow patterns generated by the shroud of FIGS. 1 and 3-5; and, FIG. 8 is a picture of streak lines taken from a side of the wind shroud of FIGS. 1, 3-5 and 7 operated in a wind tunnel under various test conditions.

With reference next to FIGS. 6 and 7 in combination wherein selected points on the wind velocity distribution chart 600 will be described with reference to the physical structure of the shroud 112 shown in FIG. 7. Essentially, the shroud 112 of the example embodiment defines a set of four (4) mutually parallel planes including a power diameter plane 650, a leading edge plane 652, a brim plan 654, and a rim trailing edge plane 656. The planes 650-656 are preferably perpendicular to the longitudinal axis L and essentially divide the shroud into the a first region I between the rotor blades 105 and the leading edge of the air horn member 230 wherein as shown a first segment 660 of the velocity magnitude curve 602 exhibits a substantial increase in wind velocity. Correspondingly, in this region I, the static pressure curve 604 includes a first portion 670 exhibiting a substantial decrease in pressure.

Significantly, in a second region II downstream of the rotor blades 105, the velocity magnitude curve 602 includes a portion 662 illustrating a substantially sustained high level of wind velocity magnitude in this region while simultaneously the static pressure curve 604 includes a portion 672 showing a further decrease in static pressure relative to the first region 670. This combination of an increasing and sustained wind velocity magnitude 660, 662 in the presence of a negative pressure gradient at the interface between the first and second regions I, II such as shown in the static pressure curve segments 670, 672 result in substantial unexpected results wherein the pressure continues to decrease through the shroud while the wind velocity magnitude is increasing or sustaining.

In addition to the above, in a third region III between the brim plane 654 and the rim training edge plane 656, it is to be observed that the velocity magnitude curve 602 includes a portion 664 illustrating a substantially sustained wind velocity magnitude while simultaneously the static pressure curve 604 includes a portion 674 illustrating a yet further drop in static pressure in this region III relative to the second region II and the first region I. It is believed that the unique combination of a wind turbine shroud 112 including a wind tunnel body 250 having both rim 254 and brim 252 members obtains these unique results.

In a fourth region IV the velocity magnitude curve 602 includes a region 668 showing a decrease in wind velocity downstream of the subject shroud returning essentially to the ambient wind condition (10 mph) and, similarly, the static pressure curve 604 includes a portion 678 showing an increase in static wind pressure returning to an essentially ambient condition.

A vertical simplified sectional view of the wind power generator of FIGS. 1 and 2 is illustrated in FIG. 7 showing wind flow patterns generated by the shroud of FIGS. 1 and 3-5. It is to be appreciated that the brim and rim members 252, 254 function to cooperatively tune the pressure regions relative to the rotating turbine blades 105 wherein as shown a high pressure zone 710 having a substantially annular shape is formed on the front windward surface of the brim member 252 and, similarly, a turbulent zone 720 having an essentially annular shape is create in a downwind (lee) direction of the brim member 252. Beneficially, a substantially circular planer low pressure zone 730 is formed within the annulus defined by the turbulent zone 720. It is to be appreciated that additional power amplification is created by the lower pressure zone 730 relative to the higher pressure of the incoming wind impacting onto the rotatable blades 105, wherein the lower pressure zone 730 causes the higher pressure air to rapidly migrate into or drawn towards the lower pressure zone. Preferably, the separation of the air zones is chosen as the location for placing the rotatable blades 105 represented in the drawing figures as the power diameter plane 650. With the blades disposed at the interface between the higher and lower pressure zones, in essence, air in front of the blades is presented to the system with a high pressure relative to the air behind the blades developed by the subject shroud which is, as described, held at a substantially lower pressure relative to the upstream air. The rapid high to low air pressure migration across the blades produces substantial wind power quotients relative to unshrouded wind turbine systems as well as relative to shrouded systems without rim and brim combinations.

In the embodiments, a wind turbine shroud includes means for generating a pronounced rapid high to low air pressure migration across the blades produces substantial wind power quotient increases, wherein the means comprises in combination a cylindrical wind tunnel shroud body including a radially outwardly extending collar-shaped brim member formed on an outside of an exhaust opening edge of an outlet of the wind tunnel body, and an axially extending tubular-shaped rim member formed on the exhaust opening edge of the outlet of the wind tunnel body.

In addition, it is to be appreciated that the shroud 112 herein is readily adaptable for use in place of the shroud structure described in connection with the other related wind turbine and tower apparatus disclosed in U.S. Ser. No. 11/845,094 incorporated herein by reference. The embodiments herein are not limited to those shown but include other shroud structures and the shroud used in other wind turbines.

FIGS. 8-10 are pictures of streak lines taken from a side of the wind shroud of FIGS. 1, 3-5 and 7 operated in a wind tunnel under various test conditions in accordance with computational fluid dynamics testing (CFD) techniques. It is to be appreciated that as shown in FIG. 8, the streak lines demonstrate a high pressure zone 810, a turbulent zone 820, and a low pressure zone 730 such as shown schematically in FIG. 7.

It is now claimed:

1. A wind power generator comprising:
   a cylindrical wind tunnel body defining a central longitudinal axis therethrough, the wind tunnel body having an inlet configured to receive a wind flow into the wind tunnel body, an outlet configured to expel the wind flow out from the wind tunnel body, and a central side wall portion defined between opposite intake and exhaust opening edges of the wind tunnel body, the central side wall potion being configured to communicate the wind flow from the inlet to the outlet in a wind flowing direction;
   a radially outwardly extending collar-shaped brim member formed on an outside of the wind tunnel body at the exhaust opening edge of the outlet of the wind tunnel body;
   a tubular-shaped rim member formed on the exhaust opening edge of the outlet of the wind tunnel body, the rim member extending beyond the brim member along the central longitudinal axis; and,
   a wind turbine for generating electricity, the wind turbine being arranged adjacent to the inlet of the wind tunnel body.

2. The wind power generator according to claim 1, wherein the brim member defines an annular diffuser member.

3. The wind power generator according to claim 2, wherein the annular diffuser member defines a diffuser plane perpendicular to the central longitudinal axis of the wind tunnel body.

4. The wind power generator according to claim 3, wherein the rim member and the central side wall portion of the wind tunnel body are disposed on opposite sides of the diffuser plane in the wind flowing direction.

5. The wind power generator according to claim 1, wherein the rim member comprises:
   a lead edge connected with the exhaust opening edge of the outlet of the wind tunnel body, wherein the lead edge is spaced radially outwardly relative to the central longitudinal axis by a first predetermined distance;
   a trailing edge spaced from the exhaust opening edge of the outlet of the wind tunnel body in the wind flowing direction, wherein the trailing edge is spaced radially outwardly relative to the central longitudinal axis by a second predetermined distance; and, a central region extending between the lead and trailing edges of the rim member.

6. The wind power generator according to claim 5, wherein:
   the lead edge is spaced radially outwardly relative to the central longitudinal axis by the first predetermined distance;
   the trailing edge is spaced radially outwardly relative to the central longitudinal axis by the second predetermined distance; and,
   wherein the first and second predetermined distances are substantially equal.

7. The wind power generator according to claim 1, wherein the rim member and the central side wall portion of the wind tunnel body are disposed on opposite sides of the brim member in the wind flowing direction.

8. The wind power generator according to claim 1, further comprising:
   an air horn member narrowing in the wind flowing direction, the air horn member being formed on the intake opening edge of the inlet of the wind tunnel body.

9. The wind power generator according to claim 1, wherein the central side wall portion is configured to communicate the wind flow from the inlet to the outlet in the wind flowing direction, wherein the wind flowing direction is substantially parallel with the central longitudinal axis.

10. The wind power generator according to claim 1, wherein:
    the brim member extends radially outwardly in a direction substantially perpendicular to the central longitudinal axis; and,
    the rim member extends in a direction substantially parallel to the central longitudinal axis.

11. A wind shroud for use with an associated wind power generator including a wind turbine for generating electricity, the wind shroud comprising:
    a cylindrical wind tunnel body defining a central longitudinal axis therethrough, the wind tunnel body having an inlet configured to receive a wind flow into the wind tunnel body, an outlet configured to expel the wind flow out from the wind tunnel body, and a central side wall portion defined between opposite intake and exhaust opening edges of the wind tunnel body, the central side wall portion being configured to communicate the wind flow from the inlet to the outlet in a wind flowing direction;
    a radially outwardly extending collar-shaped brim member coupled with the wind tunnel body at the exhaust opening edge of the outlet of the wind tunnel body; and,
    an axially extending tubular-shaped rim member coupled with the wind tunnel body at the exhaust opening edge of the outlet of the wind tunnel body.

12. The wind shroud according to claim 11, wherein the brim member defines an annular diffuser member.

13. The wind shroud according to claim 12, wherein the annular diffuser member defines a diffuser plane perpendicular to the central longitudinal axis of the wind tunnel body.

14. The wind shroud according to claim 13, wherein the rim member and the central side wall portion of the wind tunnel body are disposed on opposite sides of the diffuser plane in the wind flowing direction.

15. The wind shroud according to claim 11, wherein the rim member comprises:
    a lead edge connected with the exhaust opening edge of the outlet of the wind tunnel body, wherein the lead edge is spaced radially outwardly relative to the central longitudinal axis by a first predetermined distance;
    a trailing edge spaced from the exhaust opening edge of the outlet of the wind tunnel body in the wind flowing direction, wherein the trailing edge is spaced radially outwardly relative to the central longitudinal axis by a second predetermined distance; and,
    a central region extending between the lead and trailing edges of the rim member.

16. The wind shroud according to claim 15, wherein:
    the lead edge is spaced radially outwardly relative to the central longitudinal axis by the first predetermined distance;
    the trailing edge is spaced radially outwardly relative to the central longitudinal axis by the second predetermined distance; and,
    wherein the first and second predetermined distances are substantially equal.

17. The wind shroud according to claim 11, wherein the rim member and the central side wall portion of the wind tunnel body are disposed on opposite sides of the brim member in the wind flowing direction.

18. The wind shroud according to claim 11, further comprising:
    an air horn member narrowing in the wind flowing direction, the air horn member being formed on an intake opening edge of the inlet of the wind tunnel body.

19. The wind shroud according to claim 11, wherein the central side wall portion is configured to communicate the wind flow from the inlet to the outlet in the wind flowing direction, wherein the wind flowing direction is substantially parallel with the central longitudinal axis.

20. The wind shroud according to claim 11, wherein:
    the brim member extends radially outwardly in a direction substantially perpendicular to the central longitudinal axis; and,
    the rim member extends in a direction substantially parallel to the central longitudinal axis.

* * * * *